(12) United States Patent
Seo et al.

(10) Patent No.: US 7,983,630 B2
(45) Date of Patent: Jul. 19, 2011

(54) DIGITAL IF WIRELESS TRANSMITTER, RF MODULATOR, AND RF MODULATING METHOD

(75) Inventors: Hae Moon Seo, Gyeonggi-do (KR); Woo Chul Park, Incheon (KR); Myung Soo Lee, Gyeonggi-do (KR); Myung Hyun Yoon, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 481 days.

(21) Appl. No.: 12/234,826

(22) Filed: Sep. 22, 2008

(65) Prior Publication Data

US 2010/0046668 A1    Feb. 25, 2010

(30) Foreign Application Priority Data

Aug. 22, 2008   (KR) .................. 10-2008-0082322

(51) Int. Cl.
*H04B 1/02* (2006.01)
*H04L 27/36* (2006.01)
*H04L 27/00* (2006.01)

(52) U.S. Cl. .......... 455/91; 455/103; 455/104; 455/109; 455/126; 375/298

(58) Field of Classification Search ............ 455/91, 455/103, 104, 109, 126, 108, 110–113, 123–125; 375/295, 298
See application file for complete search history.

(56) References Cited

U.S. PATENT DOCUMENTS

| | | | | |
|---|---|---|---|---|
| 5,425,055 A * | 6/1995 | Blaker | | 375/279 |
| 6,025,758 A * | 2/2000 | Lu | | 332/100 |
| 6,240,142 B1 * | 5/2001 | Kaufman et al. | | 375/261 |
| 6,430,232 B1 * | 8/2002 | Patire | | 375/302 |
| 6,507,625 B2 * | 1/2003 | Iwamatsu et al. | | 375/316 |
| 7,755,524 B2 * | 7/2010 | Pozsgay et al. | | 341/143 |
| 2003/0118126 A1 * | 6/2003 | Moon et al. | | 375/298 |
| 2004/0125888 A1 | 7/2004 | Cho et al. | | |
| 2004/0146118 A1 * | 7/2004 | Talwalkar et al. | | 375/298 |
| 2004/0166816 A1 | 8/2004 | Chang et al. | | |
| 2004/0232985 A1 * | 11/2004 | Itahara | | 330/149 |

* cited by examiner

*Primary Examiner* — Pablo N Tran
(74) *Attorney, Agent, or Firm* — NSIP Law

(57) ABSTRACT

Provided are a digital IF wireless transmitter, an RF modulator, and an RF modulating method. A digital IF wireless transmitter includes an IF up-converting unit up-converting a baseband I signal and a baseband Q signal on the basis of a first IF, a first operating unit subtracting the first IF-up-converted I signal and the first IF-up-converted Q signal, a D/A converting unit analog converting an output signal of the first operating unit, an IF modulating unit separating the same first and second signals from the output signal of the D/A converting unit, and modulating the first and the second signals on the basis of a second IF, a high-pass filtering unit passing a single sideband of the modulated first signal, a miss-matching correcting unit correcting an error of the modulated second signal, a second operating unit subtracting an output signal of the high-pass filtering unit and an output signal of the miss-matching correcting unit, a feedback unit receiving a feedback signal output from the second operating unit, detecting an error of the feedback signal, and providing the detected error to the miss-matching correcting unit, and an RF up-converting unit up-converting the output signal of the second operating unit on the basis of an RF.

22 Claims, 3 Drawing Sheets

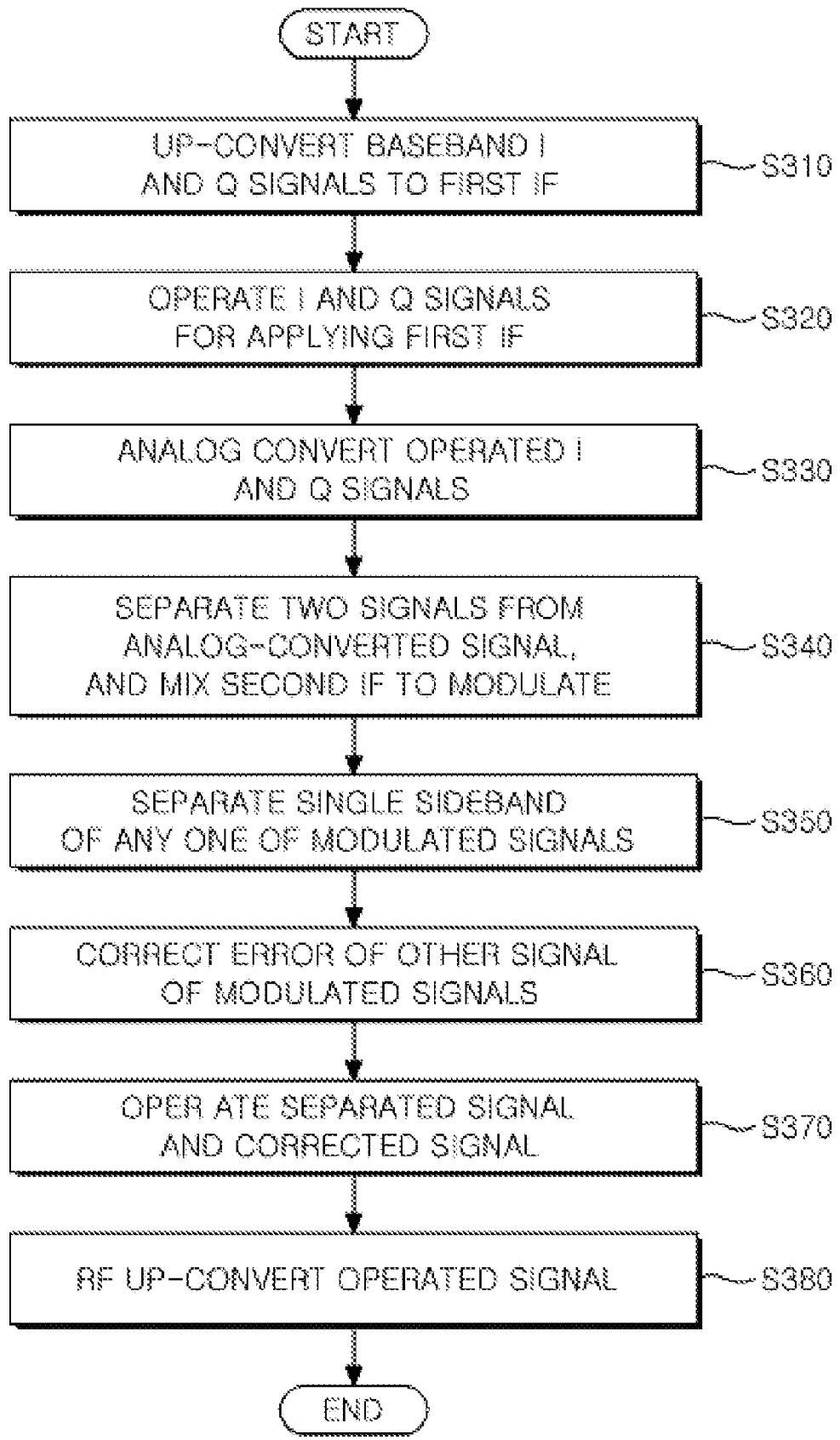

DIGITAL IF WIRELESS TRANSMITTER, RF MODULATOR, AND RF MODULATING METHOD

CROSS-REFERENCE TO RELATED APPLICATIONS

This application claims the benefit under 35 U.S.C. §119 (a) of a Korean Patent Application No. 10-2008-0082322, filed on Aug. 22, 2008 in the Korean Intellectual Property Office, the disclosure of which is incorporated herein by reference in its entirety.

TECHNICAL FIELD

The following disclosure relates to a digital Intermediate Frequency (IF) wireless transmitter, an RF modulator, and an RF modulating method, and in particular, to a digital IF wireless transmitter, an RF modulator, and an RF modulating method, which corrects an error upon a digital IF modulation.

BACKGROUND

Recently, researches have been made on a one-chip solution that is capable of supporting multiband and low-power performance on a transmitter of a wireless communication system.

Generally, a transmitter of a wireless communication system uses a super-heterodyne system. Since the super-heterodyne system uses at least one IF, it has a complicated hardware and also requires high power consumption.

Transmitters have been proposed adopting a direct conversion system and a digital IF system which do not use an analog IF.

A transmitter using a direct conversion system may shift a phase of a Radio Frequency (RF) signal to 90 degrees because a local frequency oscillator directly generates an In-phase (I) signal and a Quadrature (Q) signal. Due to the 90-degree phase shift of the RF signal, hardware becomes complicated, power consumption increases, and modulation performance may be deteriorated.

A transmitter using a digital IF system includes a system using an I path and a Q path and a system using a single path. The former may apply a D/A converter and a low-pass filter to the I path and the Q path respectively, and may have limitations in that it is difficult to match the I path with the Q path and to generate a local RF. The latter may require a band-pass filter for RF for extracting only a single-side band RF.

SUMMARY

Accordingly, according to an aspect, there is provided a digital IF wireless transmitter, an RF modulator, and an RF modulating method, which removes the unwanted sideband of a digital IF wireless transmitter.

According to another aspect, there is provided a digital IF wireless transmitter, an RF modulator, and an RF modulating method, which detects and corrects an error through a feedback upon a IF modulation for a digital IF wireless transmitter.

According to still another aspect, there is provided a digital IF wireless transmitter, including an IF up-converting unit up-converting a baseband I signal and a baseband Q signal on the basis of a first IF, a first operating unit subtracting the first IF-up-converted I signal from the first IF-up-converted Q signal, a D/A converting unit analog converting an output signal of the first operating unit, an IF modulating unit separating the same first and second signals from the output signal of the D/A converting unit, and modulating the first and the second signals on the basis of a second IF, a high-pass filtering unit passing a single sideband of the modulated first signal, a miss-matching correcting unit correcting an error of the modulated second signal, a second operating unit subtracting an output signal of the high-pass filtering unit from an output signal of the miss-matching correcting unit, a feedback unit receiving a feedback signal output from the second operating unit, detecting an error of the feedback signal, and providing the detected error to the miss-matching correcting unit, and an RF up-converting unit up-converting the output signal of the second operating unit on the basis of an RF.

According to still another aspect, there is provided an RF modulator for a digital IF wireless transmitter, the RF modulator including an IF modulating unit modulating the same first and second signals on the basis of an IF signal, a high-pass filtering unit passing a single sideband of the modulated first signal, a miss-matching correcting unit correcting an error of the modulated second signal, a operating unit subtracting an output signal of the high-pass filtering unit from an output signal of the miss-matching correcting unit, a feedback unit receiving a feedback signal output from the operating unit, detecting an error of the feedback signal, and providing the detected error to the miss-matching correcting unit, and an RF up-converting unit up-converting the output signal of the operating unit on the basis of an RF.

According to still another aspect, there is provided an RF modulating method for a digital IF wireless transmitter, the RF modulating method including up-converting a baseband I signal and a baseband Q signal on the basis of a first IF, operating the first IF-up-converted I signal and the first IF-up-converted Q signal, analog converting the operated I signal and the operated Q signal, separating the same first and second signals from the analog-converted signal, and modulating the first and the second signals on the basis of a second IF, passing a single sideband of the modulated first signal, correcting an error of the modulated second signal, operating the first signal of the single sideband and the corrected second signal, receiving a feedback of the operated signal, and detecting an error for the correction; and up-converting the operated signal on the basis of an RF.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 3 is a flowchart illustrating an RF modulating method for a digital IF wireless transmitter according to an exemplary embodiment.

Throughout the drawings and the detailed description, unless otherwise described, the same drawing reference numerals will be understood to refer to the same elements, features, and structures.

DETAILED DESCRIPTION OF EMBODIMENTS

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
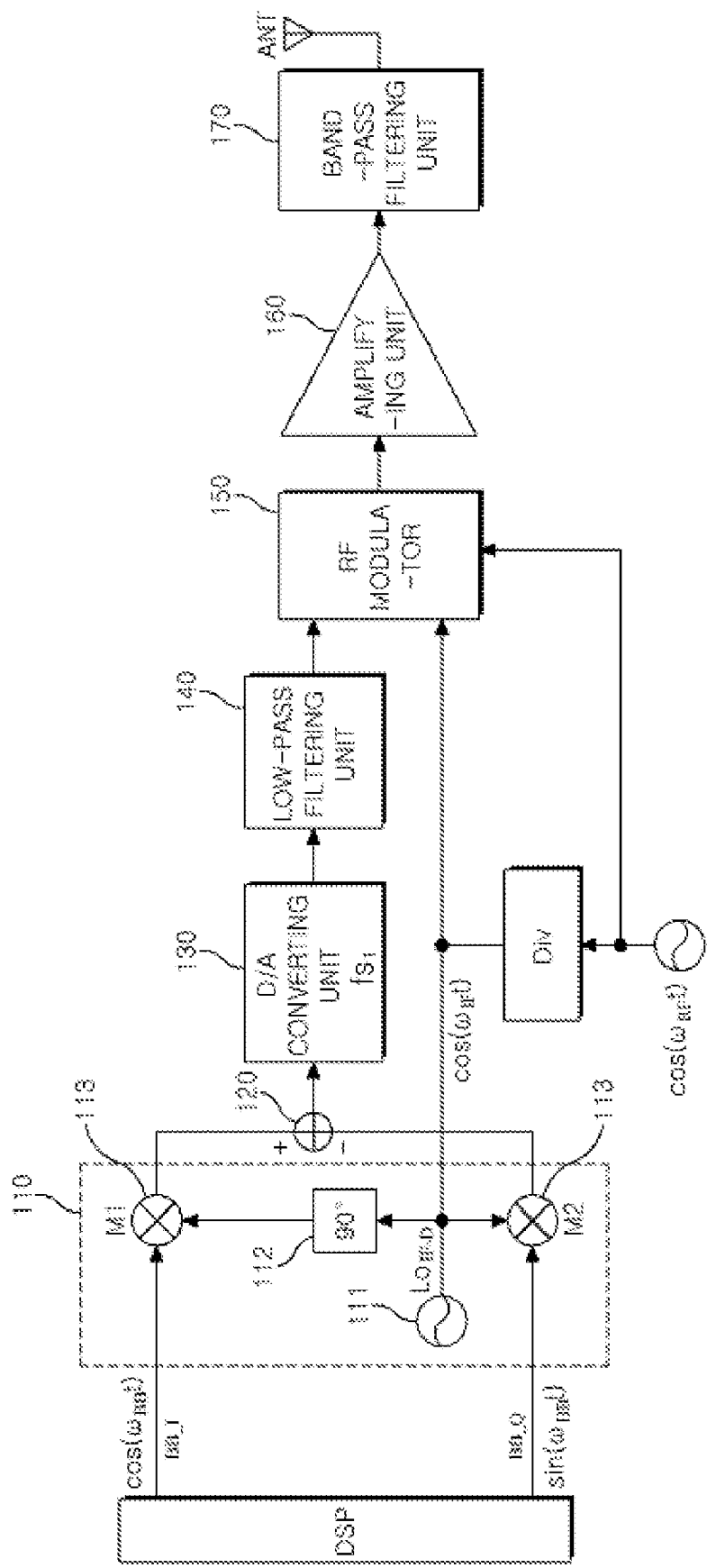
FIG. 1 is a block diagram of a digital IF wireless transmitter including an RF modulator according to an exemplary embodiment.

FIG. 1 illustrates a digital IF wireless transmitter including an RF modulator according to an exemplary embodiment.

Referring to FIG. 1, a digital IF wireless transmitter according to an exemplary embodiment may correct a miss-matching error upon an IF modulation using a single sideband, and comprises an IF up-converting unit 110, a first operating unit 120, a D/A converting unit 130, a low-pass filtering unit 140, an RF modulator 150, an amplifying unit 160, and a band-pass filtering unit 170.

The IF up-converting unit 110 up-converts a baseband I signal $\cos(w_{BB}t)$ and a Q signal $\sin(w_{BB}t)$ on the basis of a first intermediate frequency $L_O IF_D$, and includes a first IF oscillator 111, a phase shifter 112 and a first mixer (M1 and M2) 113. Herein, the baseband I signal and the baseband Q signal are a digital-modulated quadrature signal output by a Digital Signal Processor (DSP).

For example, the first IF oscillator 111 generates a first IF signal and the phase shifter 112 shifts a phase of the first IF signal by 90 degrees to output a signal having a 90-degree shifted phase. The first mixer 113 mixes the baseband I signal with the output signal of the phase shifter 112 to output the mixed signal, and mixes the baseband Q signal with the first IF signal to output the mixed signal. On the other hand, the mixer 113 may mix the baseband Q signal with the output signal of the phase shifter 112 to output the mixed signal, and may mix the baseband I signal with the first IF signal to output the mixed signal.

The operating unit 120 operates an I signal and a Q signal up-converted to the first IF. At this point, the operating unit 120 may subtract the first IF-up-converted Q signal from the first IF-up-converted I signal.

The D/A converting unit 130 digital-to-analog converts the output of the first operating unit 120. Herein, a sampling frequency $fs_1$ is n times the first IF (n is two or more integers).

The low-pass filtering unit 140 outputs a signal in which a sideband being an unwanted harmonic component occurring in an analog conversion process of the D/A converting unit 130 is removed, wherein the signal is expressed as Equation (1) below. Where the D/A converting unit 130 has excellent efficiency, the low-pass filtering unit 140 may not be applied.

$$\cos(w_{IF}t)\cos(w_{BB}t) - \sin(w_{IF}t)\sin(w_{BB}t) = \\ \cos((w_{IF} + w_{BB})t) + \cos((w_{IF} - w_{BB})t) - \\ \cos((w_{IF} - w_{BB})t) + \cos((w_{IF} + w_{BB})t) = 2\cos((w_{IF} + w_{BB})t) \quad (1)$$

The RF modulator 150 includes an IF modulating unit 210, a high-pass filtering unit 220, a miss-matching correcting unit 230, a feedback unit 240, a second operating unit 250, and an RF up-converting unit 260. The detail configuration of the RF modulator 150 will be described below with reference to FIG. 2.

The amplifying unit 160 amplifies the output signal of the RF modulator 150 to enable a long-distance transmission.

The band-pass filtering unit 170 band-pass filters the output signal of the amplifying unit 160 to remove an unwanted harmonic component.

Figure 2:
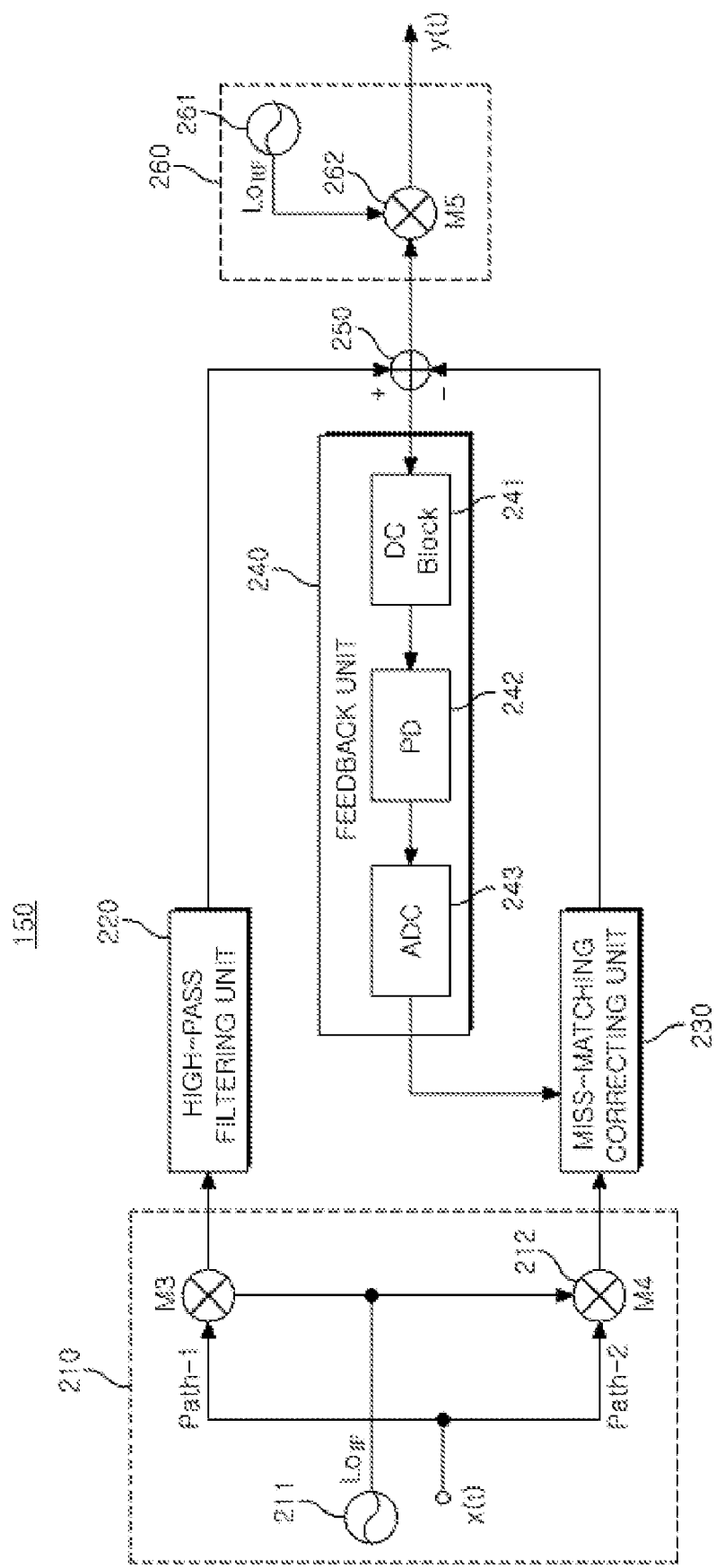
FIG. 2 is a block diagram of an RF modulator according to an exemplary embodiment.

Hereinafter, the RF modulator 150 of the digital IF wireless transmitter will be described with reference to FIG. 2. FIG. 2 is illustrates an RF modulator according to an exemplary embodiment.

Referring to FIG. 2, the RF modulator 150 converts a single sideband into an RF band, and comprises the IF modulating unit 210, the high-pass filtering unit 220, the miss-matching correcting unit 230, the feedback unit 240, the second operating unit 250, and the RF up-converting unit 260.

The IF modulating unit 210 separates a first signal and a second signal from an input signal, modulates the first signal and the second signal on the basis of a second IF signal, and includes a second IF oscillator 211 and a second mixer (M3 and M4) 212. Herein, the input signal of the IF modulating unit 210 may be the output signal of the D/A converting unit 130 of FIG. 1 or the baseband I signal and Q signal being the output of the low-pass filtering unit 140 of FIG. 1. According to another aspect, the input signal of the IF modulating unit 210 may be the analog I signal and Q signal of a first IF band up-converted by the first IF signal.

The second IF oscillator 211 generates a second IF signal LoIF used in IF modulation, and the second mixer 212 mixes the second IF signal LoIF generated by the second IF oscillator 211 with the first signal and the second signal respectively, and outputs the mixed signals. At this point, the output of the second mixer 212 may be expressed as Equation (2) below.

$$\cos((w_{IF} + w_{BB})t)\cos(w_{IF}t) = \cos((2w_{IF} + w_{BB})t) + \cos(w_{BB}t) \quad (2)$$

The high-pass filtering unit 220 high-pass filters the first signal by the IF modulating unit 210 to separate only a single sideband for increasing spectrum efficiency.

The miss-matching correcting unit 230 corrects an error of the second signal using an error provided from the feedback unit 240.

The second operating unit 250 performs a subtraction operation on the output of the high-pass filtering unit 220 and the output of the miss-matching correcting unit 230. At this point, the second operating unit 250 may perform other operations such as summation and multiplication, in addition to subtraction.

The feedback unit 240 receives a feedback signal output from the second operating unit 250, detects an error of the feedback signal, and provides the detected error to the miss-matching correcting unit 230. The feedback unit 240 includes a DC blocker 241, a power detector 242, and an A/D converter 243.

For example, the DC blocker 241 removes Direct Current (DC) from the output of the second operating unit 250. The power detector 242 detects the amplitude of a signal output from the DC blocker 241. The A/D converter 243 analog-to-digital digital-converts the detected amplitude and provides the converted amplitude to the miss-matching correcting unit 230.

The RF modulator 150 may correct a phase error, in addition to an amplitude error. At this point, the feedback unit 240 may be configured to detect the phase error as well as the amplitude error.

The miss-matching correcting unit 230 may be configured to minimize the amplitude error expressed as Equation (3) below and the phase error expressed as Equation (4) below.

$$\cos((w_{IF}+w_{BB})t)\cos(w_{IF}t) - \varphi(\cos((w_{IF}+w_{BB})t)\cos(w_{IF}t)) = \quad (3)$$
$$\cos((2w_{IF}+w_{BB})t) + \cos(w_{BB}t) - \alpha\cos((2w_{IF}+w_{BB})t) -$$
$$\beta\cos(w_{BB}t) = (1-\alpha)\cos((2w_{IF}+w_{BB})t) + (1-\beta)\cos(w_{BB}t)$$

$$\cos((w_{IF}+w_{BB})t)\cos(w_{IF}t) - \varphi(\cos((w_{IF}+w_{BB})t)\cos(w_{IF}t)) = \quad (4)$$
$$\cos((2w_{IF}+w_{BB})t) + \cos(w_{BB}t) - 1*\cos((2w_{IF}+w_{BB})t+\theta) -$$
$$\beta\cos(w_{BB}t) = -2\sin\left((2w_{IF}+w_{BB})t+\frac{\theta}{2}\right)\sin\left(\frac{\theta}{2}\right) + (1-\beta)\cos(w_{BB}t) =$$
$$-2\sin\left(\frac{\theta}{2}\right)\cos\left((2w_{IF}+w_{BB})t+\frac{\theta}{2}-\frac{\pi}{2}\right) + (1-\beta)\cos(w_{BB}t)$$

The RF up-converting unit 260 up-converts the output signal of the second amplifying unit 250 on the basis of the RF, outputs a signal expressed as Equation (5) below, and includes an RF oscillator 261 and a third mixer (M5) 262.

$$\cos(w_{BB}t)\cos(w_{RF}t) = \cos((w_{RF}+w_{BB})t) + \cos((w_{RF}-w_{BB})t) \quad (5)$$

The RF oscillator 261 generates the RF signal LoRF for RF up-conversion, and the third mixer 262 mixes the output signal of the second operating unit 250 with the output signal of the RF oscillator 261 to RF up-convert the output signal of the second operating unit 250.

Hereinafter, a process where a digital IF wireless transmitter performs RF modulation in a digital IF system will be described. FIG. 3 is a flowchart illustrating an RF modulating method for a digital IF wireless transmitter according to an exemplary embodiment.

In operation S310, the digital IF wireless transmitter up-converts the baseband I signal and the baseband Q signal on the basis of the first IF.

For example, the digital IF wireless transmitter generates the first IF signal and shifts a phase of the generated first IF signal by 90 degrees. Furthermore, the digital IF wireless transmitter mixes the shifted first IF signal with the baseband I signal to output the mixed signal, and mixes the baseband Q signal with the shifted first IF signal to output the mixed signal.

In operation S320, the digital IF wireless transmitter operates a first IF-up-converted I signal and a first IF-up-converted Q signal. At this point, the digital IF wireless transmitter may subtract the first IF-up-converted Q signal from the first IF-up-converted I signal.

In operation S330, the digital IF wireless transmitter analog converts the operated signal. At this point, the low-pass filtering unit 140 may low-pass filter the analog-converted signal to remove the sideband.

In operation S340, the digital IF wireless transmitter separates the first signal and the second signal from the analog-converted signal, and respectively modulates the first and the second signals on the basis of the second IF. For example, the digital IF wireless transmitter separates the first and the second signals from the analog-converted signal, and generates the second IF signal. Furthermore, the digital IF wireless transmitter mixes the first signal with the second IF signal to modulate the first signal, and mixes the second signal with the second IF signal to modulate the second signal.

In operation S350, the digital IF wireless transmitter passes the modulated first signal through the high-pass filtering unit 220 to separate the signal sideband.

In operation S360, almost simultaneously, the digital IF wireless transmitter applies the preceding detected error to correct the amplitude or phase error of the modulated second signal.

In operation S370, the digital IF wireless transmitter performs a subtraction operation on the first signal from which the single sideband is separated and the second signal in which an error is corrected.

At this point, the digital IF wireless transmitter may receive the feedback of operated signal and detect an amplitude error or a phase error, thereby continuously correcting the errors.

In operation S380, the digital IF wireless transmitter up-converts the operated signal on the basis of the RF. For example, the digital IF wireless transmitter generates the RF signal, and corrects an error. Furthermore, the digital IF wireless transmitter mixes the operated signal with the RF to up-convert the operated signal.

Thereafter, the digital IF wireless transmitter may amplify a signal up-converted to the RF for a long-distance transmission, or high-pass filter the amplified signal for removing a noise and transmit the filtered signal.

Certain exemplary embodiments described above may correct an error without shifting a phase of the RF signal by using an RF modulation system for the digital IF wireless transmitter, thereby enhancing the efficiency and linearity for IF modulation and reducing the power consumption and cost.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A digital Intermediate Frequency (IF) wireless transmitter, comprising:
    an IF up-converting unit up-converting a baseband I signal and a baseband Q signal on the basis of a first IF;
    a first operating unit subtracting the first IF-up-converted I signal from the first IF-up-converted Q signal;
    a D/A converting unit analog converting an output signal of the first operating unit;
    an IF modulating unit separating the same first and second signals from the output signal of the D/A converting unit, and modulating the first and the second signals on the basis of a second IF;

a high-pass filtering unit passing a single sideband of the modulated first signal;
a miss-matching correcting unit correcting an error of the modulated second signal;
a second operating unit subtracting an output signal of the high-pass filtering unit from an output signal of the miss-matching correcting unit;
a feedback unit receiving a feedback signal output from the second operating unit, detecting an error of the feedback signal, and providing the detected error to the miss-matching correcting unit; and
a Radio Frequency (RF) up-converting unit up-converting the output signal of the second operating unit on the basis of an RF.

2. The digital IF wireless transmitter of claim 1, wherein the IF up-converting unit comprises:
a first IF oscillator generating the first IF signal;
a phase shifter shifting a phase of the first IF signal by 90 degrees; and
a first mixer mixing the baseband I signal with an output signal of the phase shifter to output the mixed signal, and mixing the baseband Q signal with the first IF signal to output the mixed signal.

3. The digital IF wireless transmitter of claim 1, further comprising a low-pass filtering unit removing a sideband from the output signal of the D/A converting unit to transfer the first and the second signals from which the sideband is removed to the IF modulating unit.

4. The digital IF wireless transmitter of claim 1, wherein the IF modulating unit comprises:
a second IF oscillator generating the second IF signal; and
a second mixer mixing the first and the second signals with the second IF signal to modulate the first and the second signals.

5. The digital IF wireless transmitter of claim 1, wherein the feedback unit comprises:
a Direct Current (DC) blocker removing a DC from the output signal of the second operating unit;
a power detector detecting an amplitude error of a signal output from the DC blocker; and
an A/D converter digital converting the detected amplitude, and providing the digital-converted amplitude to the miss-matching correcting unit.

6. The digital IF wireless transmitter of claim 1, wherein the RF up-converting unit comprises:
an RF oscillator generating the RF signal; and
a third mixer mixing the output signal of the second operating unit with an output signal of the RF oscillator.

7. The digital IF wireless transmitter of claim 1, further comprising an amplifying unit amplifying an output signal of the RF up-converting unit.

8. The digital IF wireless transmitter of claim 7, further comprising a band-pass filtering unit band-pass filtering an output signal of the amplifying unit.

9. A Radio Frequency (RF) modulator for a digital Intermediate Frequency (IF) wireless transmitter, the RF modulator comprising:
an IF modulating unit modulating the same first and second signals on the basis of an IF signal;
a high-pass filtering unit passing a single sideband of the modulated first signal;
a miss-matching correcting unit correcting an error of the modulated second signal;
a operating unit subtracting an output signal of the high-pass filtering unit from an output signal of the miss-matching correcting unit;
a feedback unit receiving a feedback signal output from the operating unit, detecting an error of the feedback signal, and providing the detected error to the miss-matching correcting unit; and
an RF up-converting unit up-converting the output signal of the operating unit on the basis of an RF.

10. The RF modulator of claim 9, wherein the IF modulating unit comprises:
an IF oscillator generating the IF signal; and
a mixer mixing the first and the second signals with the IF signal to modulate the first and the second signals.

11. The RF modulator of claim 9, wherein the feedback unit comprises:
a Direct Current (DC) blocker removing a DC from the output signal of the operating unit;
a power detector detecting an amplitude error of a signal output from the DC blocker; and
an A/D converter digital converting the detected amplitude, and providing the digital-converted amplitude to the miss-matching correcting unit.

12. The RF modulator of claim 9, wherein the RF up-converting unit comprises:
an RF oscillator generating the RF signal; and
a mixer mixing the output signal of the operating unit with an output signal of the RF oscillator.

13. The RF modulator of claim 9, wherein the error comprises any one of an amplitude error and a phase error.

14. A Radio Frequency (RF) modulating method for a digital Intermediate Frequency (IF) wireless transmitter, the RF modulating method comprising:
up-converting a baseband I signal and a baseband Q signal on the basis of a first IF;
operating the first IF-up-converted I signal and the first IF-up-converted Q signal;
analog converting the operated I signal and the operated Q signal;
separating the same first and second signals from the analog-converted signal, and modulating the first and the second signals on the basis of a second IF;
passing a single sideband of the modulated first signal;
correcting an error of the modulated second signal;
operating the first signal of the single sideband and the corrected second signal;
receiving a feedback of the operated signal, and detecting an error for the correction; and
up-converting the operated signal on the basis of an RF.

15. The RF modulating method of claim 14, wherein the up-converting of the I and Q signals comprises:
generating the first IF signal;
shifting a phase of the first IF signal by 90 degrees; and
mixing the baseband I signal with the shifted signal to output the mixed signal, and mixing the baseband Q signal with the first IF signal to output the mixed signal.

16. The RF modulating method of claim 14, wherein the operating of the I and Q signals comprises subtracting the first IF-up-converted Q signal from the first IF-up-converted I signal.

17. The RF modulating method of claim 14, wherein the separating and modulating of the signals comprises removing a sideband from the analog-converted signal, and separating the first and the second signals.

18. The RF modulating method of claim 14, wherein the separating and modulating of the signals comprises:
generating the second IF signal; and
mixing and modulating individually the separated signals with the second IF signal to modulate the separated signals.

19. The RF modulating method of claim 14, wherein the operating of the corrected second signal comprises subtracting the corrected second signal from the first signal of the single sideband.

20. The RF modulating method of claim 14, wherein the detecting of the error comprises:
   receiving a feedback of the operated signal to detect an analog amplitude error; and
   digital converting the detected amplitude error.

21. The RF modulating method of claim 14, wherein the up-converting of the operated signal comprises:
   generating the RF signal; and
   mixing the operated signal with the RF signal.

22. The RF modulating method of claim 14, further comprising:
   amplifying the RF-up-converted signal; and
   band-pass filtering the amplified signal.

* * * * *